United States Patent

[11] 3,592,410

[72] Inventors Richard B. Kosten
Bayside;
Ralph Johnson, Huntington, both of, N.Y.
[21] Appl. No. 880,800
[22] Filed Nov. 28, 1969
[45] Patented July 13, 1971
[73] Assignee Sylvania Electric Products, Inc.

[54] TAPE TRANSPORT APPARATUS
6 Claims, 2 Drawing Figs.

[52] U.S. Cl. .......... 242/192, 242/55, 242/201
[51] Int. Cl. .......... G03b 1/04, G11b 15/32, B11b 15/32
[50] Field of Search .......... 242/192, 200—204, 208—210, 191, 187

[56] References Cited
UNITED STATES PATENTS
3,460,781 8/1969 Uber .......... 242/192
3,482,800 12/1969 Barnett et al. .......... 242/192
3,489,369 1/1970 Ganske et al. .......... 242/187

*Primary Examiner*—Leonard D. Christain
*Attorneys*—Norman J. O'Malley and Theodore Jay, Jr.

ABSTRACT: A tape transport utilizes a reversible rotatable capstan interposed between two spaced tape-wound spools and making resilient peripheral contact with a selected point on each spool. The direction of rotation of the capstan determines which spool acts as a supply and which spool acts as a takeup spool.

Cams, linkages, springs and drive rollers coupled to axial shafts extending through each spool establish a first pressure urging the takeup spool toward the capstan and applied at the point of arrival which is larger than and oppositely directed to a second pressure urging the supply spool toward the capstan and applied at the point of departure.

INVENTOR
RICHARD B. KOSTEN
BY RALPH JOHNSON
Theodore Jay Jr.
ATTORNEY

TAPE TRANSPORT APPARATUS

BACKGROUND OF THE INVENTION

A known type of tape transport employs a reversible rotatable capstan interposed between two spaced tape-wound spools and making peripheral resilient contact at the takeup spool at the point of tape arrival and at the supply spool at the point of tape departure. Typically, the tape is a magnetic tape and is coupled to a recording head at a position intermediate the spools.

The direction of rotation of the capstan determines which spool acts a supply spool and which spool acts as a takeup spool. These spools interchange supply and takeup functions when the direction of capstan rotation is reversed. Each spool is provided with an axially extending shaft which rotates therewith.

In this type of transport, the takeup roll at the point of tape arrival must be urged against the capstan by a first pressure which is oppositely directed to and larger than a second pressure urging the supply roll against the capstan at the point of tape departure. The difference between these pressures, the differential pressure, remains essentially constant in magnitude regardless of the direction of tape feed, but must be reversed in direction each time the direction of tape feed is reversed.

My invention is directed toward new apparatus adapted to cooperate with the capstan and spools in order to maintain proper differential pressures during normal operation and, during instants in which reversals ensure, to reverse the direction of the differential pressure in synchronization with the reversal of direction of tape feed. This apparatus is characterized by long term durability and efficiency in operation.

SUMMARY OF THE INVENTION

In my invention, a first arm is pivotally secured at one end to a first fixed pivot point and is rotatably secured at second point displaced therealong to one of the spool shafts. A second arm is pivotally secured at one end to a second fixed pivot point spaced from the first pivot point and is rotatably secured at a second point displaced therealong to the other of the spool shafts. The arms extend at right angles to the corresponding shafts.

A first cam is pivotally secured to a point offset from but secured to the first arm and is provided with an additional point spaced from the offset point. A second cam is pivotally secured to a point offset from but secured to the second arm and is provided with an additional point spaced from the offset point. A tension spring extends between the cams and is secured at each end to a corresponding one of the additional points.

I further provide means interconnecting and cooperating with both cams and both shafts. This means establishes a first separation length between the additional point on the cam associated with the takeup spool and the fixed pivot point on the arm associated with the takeup spool. This means simultaneously establishes a second separation length between the additional point on the other cam (i.e., the cam associated with the supply spool) and the other fixed pivot point (i.e., the point on the arm associated with the supply spool). The first length is much larger than the second length, the ratio of the first length to the second length being a constant. By virtue of this ratio, a mechanical advantage is established whereby the proper differential pressure both in magnitude and direction is attained. When the direction of tape feed is reversed, the means acts to reverse the direction of the differential pressure while maintaining the same magnitude, thus enabling the tape transport to operate properly during periods of reversal as well as during periods of normal operation.

DETAILED DESCRIPTION OF PREFERRED EMBODIMENTS

Figure 1:
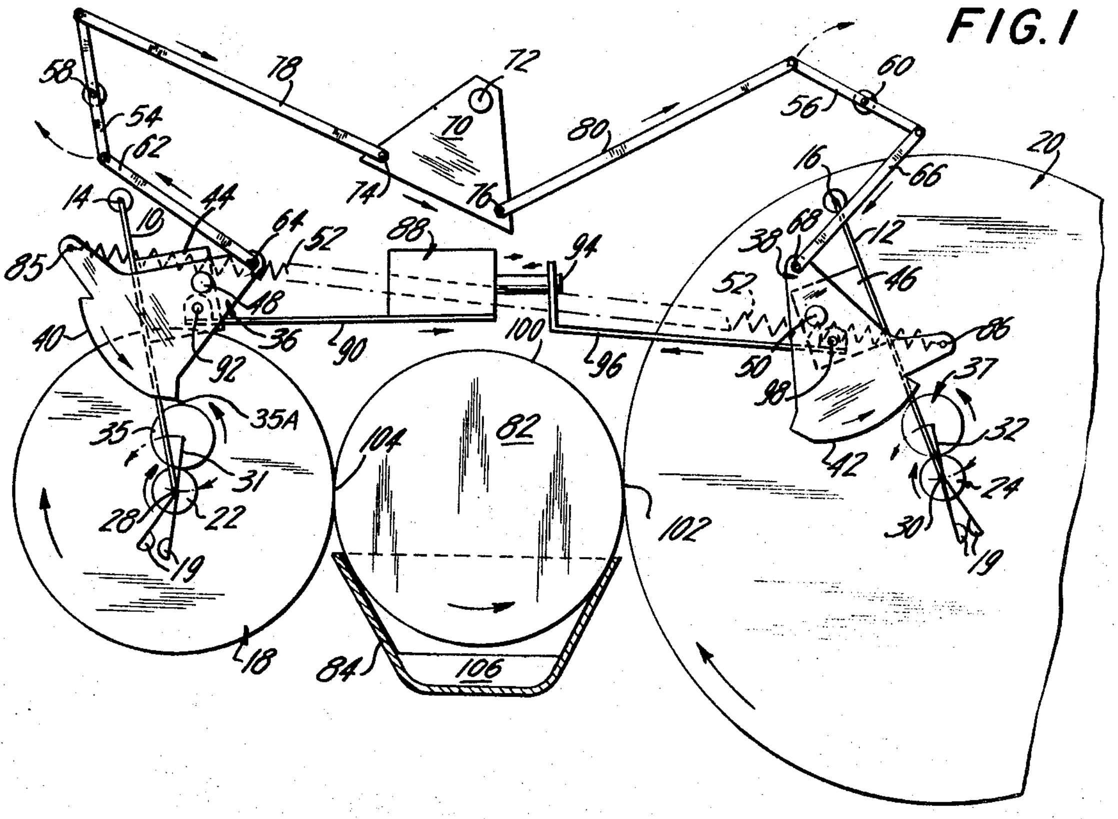
FIG. 1 is a diagrammatic view of my invention showing a capstan and supply and takeup spools at the instant before the direction of rotation of the capstan is to be reversed.
Figure 2:
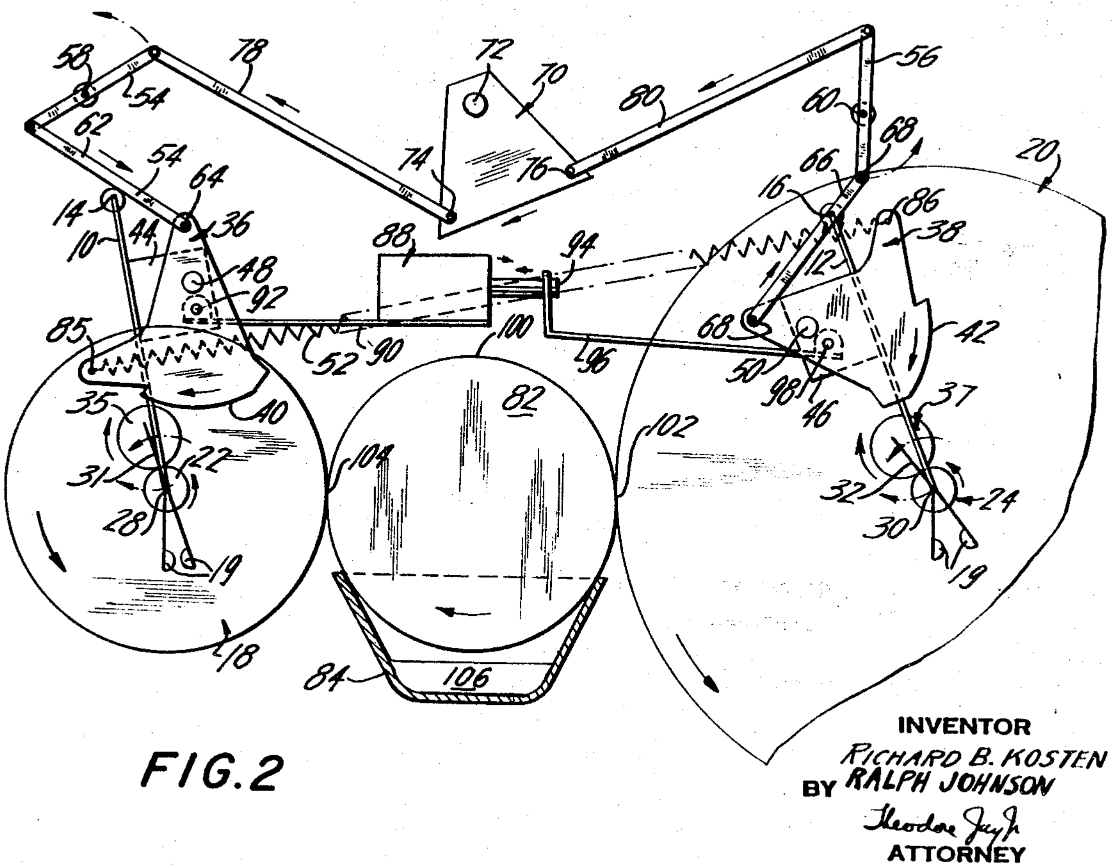
FIG. 2 is a view similar to FIG. 1, but showing the capstan and supply and takeup spools at the instant after the direction of rotation of the capstan has been reversed.

Referring now to FIGS. 1 and 2, a drive capstan 82 has a resilient peripheral surface 100 driving flangeless spools 18 and 20 carrying tape 84 at the point of departure of the tape from the spool acting as the supply spool and at the point of tape arrival on to the spool acting as the takeup spool. In FIG. 1, spool 18 is the supply spool, 104 the point of departure, spool 20 is the takeup spool and 102 is the point of arrival. The capstan rotates counterclockwise. When the direction of capstan rotation is reversed, the position of points of arrival and departure are reversed and the functions of supply and takeup of the spools are also reversed. The tape as it moves between the points of arrival and departure passes around fixed shoe 106.

In this type of drive system, the takeup spool at the point of tape arrival must be urged against the capstan by a first pressure which is oppositely directed to and larger than a second pressure which urges the supply spool against the capstan at the point of tape departure. The difference between these two pressures, the differential pressure, remains essentially constant in magnitude (except for transients developed during each instant in which the drive direction is reversed) but must be reversed in direction, each time the spools interchange functions.

My invention is directed toward apparatus cooperating with the capstan and spools to maintain proper differential pressures during normal operation and, during instants in which reversals ensue, to reverse the direction of the differential pressure in synchronization with the reversal of direction of tape feed.

To this end, arms 10 and 12 are each pivotally secured at one end to a corresponding one of fixed pivot points 14 and 16 disposed adjacent spools 18 and 20 respectively. Each of these spools has a corresponding axial shaft 22 or 24 which rotates therewith. Shafts 22 and 24 are each rotatably secured at one end to a corresponding one of arms 10 and 12 at a corresponding point 28 or 30 remote from the corresponding one of pivot points 14 and 16. Each shaft 22 or 24 extends at right angles to the corresponding arm.

Extensions 31 and 32, each extending at right angles to the corresponding drive shaft, are each rotatably disposed about a corresponding one of points 28 or 30 at a point intermediate its ends.

Rollers 35 and 37 are each rotatably disposed about corresponding one of extensions 31 and 32 at a point remote from the corresponding one of points 28 and 30. Each of rollers 35 and 37 can be placed in contact with a corresponding one of drive shafts 22 and 24 and to be rotated thereby in a direction opposite to the direction of rotation thereof. The rollers have floating centers whereby each roller is free to move slightly either toward or away from the corresponding drive shaft.

Cams 36 and 38 are each pivotable about a corresponding one of pivot points 48 and 50. Each of these points is located on a corresponding one of brackets 44 and 46. Each of brackets 44 and 46 is secured to a corresponding one of arms 10 and 12. Consequently, each of point points 48 and 50 is offset from but is secured to a corresponding one of arms 10 and 12.

Cams 36 and 38 each have a corresponding cam surface 40 and 42 adjacent to a corresponding one of rollers 35 and 37. When a roller is squeezed between the corresponding cam surface and the corresponding drive shaft, the roller is rotated by the corresponding drive shaft and rotates the corresponding cam; otherwise the roller and cam surface are disengaged. To this end each corresponding arm-extension pair, for example arm 10 and extension 31, have cooperating stops !9.

Point 85 on cam 36 is connected to point 86 on cam 38 by tension spring 52. A solenoid 88 is secured by an elongated member 90 to a pivot point 92 on bracket 44. The plunger 94 of this solenoid is connected via extension 96 to a pivot point 98 on bracket 46. Normally member 90 and extension 96 are separated as shown. During instants of reversal, the solenoid is energized and member 90 and extension 96 are pulled toward each other to maintain sufficient pressures on the spools and capstan.

Linkages 54 and 56 are each rotatably secured at a point intermediate its ends to a corresponding one of fixed pivot points 58 and 60. One end of linkage 54 is pivotally secured to one end of linkage 62. The other end of linkage 62 is pivotally secured to point 64 on cam 36. One end of linkage 56 is pivotally secured to one end of linkage 66. The other end of linkage 66 is pivotally secured at point 68 on cam 38.

A point member 70 is pivotally secured to fixed pivot point 72. Points 60, 58 and 72 fall along a common line, and point 72 is equidistantly spaced from each of points 58 and 60. Member 70 carries two points 74 and 76 remotely disposed from point 72.

Linkage 78 is pivotally secured at one end to point 74 and is pivotally secured at its other end to the other end of linkage 54 remote from linkage 62. Linkage 80 is pivotally secured at one end to point 76 and is pivotally secured at its other end to the other end of linkage 56 remote from linkage 66.

As previously indicated, it is necessary to maintain proper differential pressure between the takeup spool and capstan at the point of tape arrival and between the supply spool and capstan at the point of tape departure. This is accomplished by varying the distance or separation length between fixed point 14 and point 85 on cam 36 on the one hand and the separation length between fixed point 16 and point 86 on cam 38 on the other hand. In particular, when spool 20 is functioning as a supply spool, the distance between point 16 and point 86 is much smaller than the distance between point 14 and point 85. The mechanical advantage resulting from this geometry, as developed by the various linkages, cams and pivot member is employed to maintain a larger pressure between spool 18 and the capstan at the point of arrival than the pressure maintained between spool 20 and the capstan at the point of departure. When the spools interchange functions, the distance between point 16 and point 86 becomes much larger than the distance between points 14 and 85, and the desired reversal of differential pressure is achieved. The mechanical advantage is defined by the ratio of the maximum separation to the minimum separation between either pair of points. The actual value employed will vary depending upon the geometries employed and operating conditions specified.

In order to explain the operation of my invention in detail, reference is first made to FIG. 1. At the instant before reversal of the direction of rotation of the capstan, with spool 18 functioning as the supply and spool 20 as the takeup, electrical or electronic means momentarily energized solenoid 88. Member 90 and extension 96 are pulled together. The direction of rotation of the capstan is then reversed. The stops 19 on arm 12 and extension 32 are engaged. Roller 37 is squeezed between drive shaft 24 and cam surface 42 whereby the roller 37 begins to rotate clockwise and engage the cam surface. (Roller 35, by virtue of flat 35A on cam surface 40 does not at the same time engage cam surface 40.) However, the roller 37 swings cam 38 counterclockwise from the position shown in FIG. 1. As this swing is in process, the resultant movement of the linkages and pivot member causes cam 36 to swing counterclockwise past roller 35 without contact between this roller and the cam surface. The stops 19 on arm 10 and extension 31 are disengaged.

The solenoid 18 is deenergized and the positions of the rollers and cams as shown in FIG. 1 have been reversed as shown in FIG. 2, and the positions of supply and takeup spools have been interchanged. During the next reversal, the cams and rollers act in reverse manner to restore conditions as shown in FIG. 1.

What I claim is:

1. Tape transport apparatus utilizing a reversible rotatable capstan interposed between two spaced tape-wound spools and making resilient peripheral contact with a selected point on each spool, the direction of rotation of said capstan determining which spool acts as a supply spool and which spool acts as a takeup spool, said spools interchanging supply and takeup functions when the direction of capstan rotation is reversed, each spool having an axially extending shaft which rotates therewith, said apparatus comprising:
   two spaced fixed pivot points;
   a pair of arms, each arm being pivotally secured at a first selected point therealong to a corresponding one of said pivot points and being rotatably secured at a second and physically displaced point therealong to a corresponding one of said spool shafts, each arm extending at right angles to the corresponding shaft;
   a pair of cams, each cam being pivotally secured to a point offset from but secured to a corresponding arm, each cam having an additional point thereon which is spaced from the corresponding offset point;
   a tension spring extending between said cams, each end of said spring being pivotally secured to a corresponding one of said additional points; and
   means interconnecting and cooperating with said cams and also cooperating with said shafts to establish simultaneously a first separation length between the fixed point on the arm associated with the takeup spool and the additional point on the corresponding cam and a second separation length between the additional point on the other cam and the other fixed pivot point, said first length being substantially longer than said second length, the ratio of said first length of said second length being substantially constant.

2. Apparatus as set forth in claim 1 further including solenoid means coupled between said arms and energized during instants of reversal to pull said arms toward each other.

3. Apparatus as set forth in claim 2 wherein said interconnecting means includes a member pivotable about a third fixed pivot point disposed between said two spaced pivot points, a first set of interconnected linkages connected between said member and one of said cams and a second set of interconnected linkages interconnected between side member and the other of said cams.

4. Apparatus as set forth in claim 3 wherein the interconnecting means means include a pair of rollers, each roller being adapted to be moved into driven engagement with a corresponding one of the spool shafts, and with the surface of a corresponding one of said cams.

5. Apparatus as set forth in claim 4 wherein said interconnecting means includes a pair of tensions, each extension being rotatably secured to a corresponding one of the shafts and further being rotatably secured to a corresponding one of the rollers, said each extension extending at right angles to said corresponding roller and shaft.

6. Apparatus as set forth in claim 5 further including a pair of brackets, each bracket being secured to a corresponding arm, each said offset point being disposed on a corresponding one of said brackets.

PO-1050
(5/69)

UNITED STATES PATENT OFFICE
CERTIFICATE OF CORRECTION

Patent No. 3,592,410 Dated July 13, 1971

Inventor(s) Richard B. Kosten and Ralph Johnson

It is certified that error appears in the above-identified patent and that said Letters Patent are hereby corrected as shown below:

Line 5 in the Abstract insert the word--spool--after supply.

Column 1, line 14 in the specification insert the word--as--after acts in the first instance.

Columnl, line 31 "ensure" should read--ensue--.

Column 2, line 67 "point" should read--pivot--.

Column 3, line 2 "!9" should read--19--.

Column 3, line 19 "point" in the first instance should read--pivot--.

Claim 1, column 4, line 41 "of" in the second instance should read--to--.

Claim 3, column 4, line 51 "side" should read--said--.

Claim 4, column 4, line 54 delete--means--in the first instance--.

Claim 5, column 4, line 59 "tensions" should read--extensions--.

Signed and sealed this 4th day of January 1972.

(SEAL)
Attest:

EDWARD M.FLETCHER,JR.
Attesting Officer

ROBERT GOTTSCHALK
Acting Commissioner of Patents